Jan. 17, 1950 G. R. MEZGER 2,494,570
ELECTRICAL TRANSDUCER
Filed Jan. 22, 1946 3 Sheets-Sheet 1
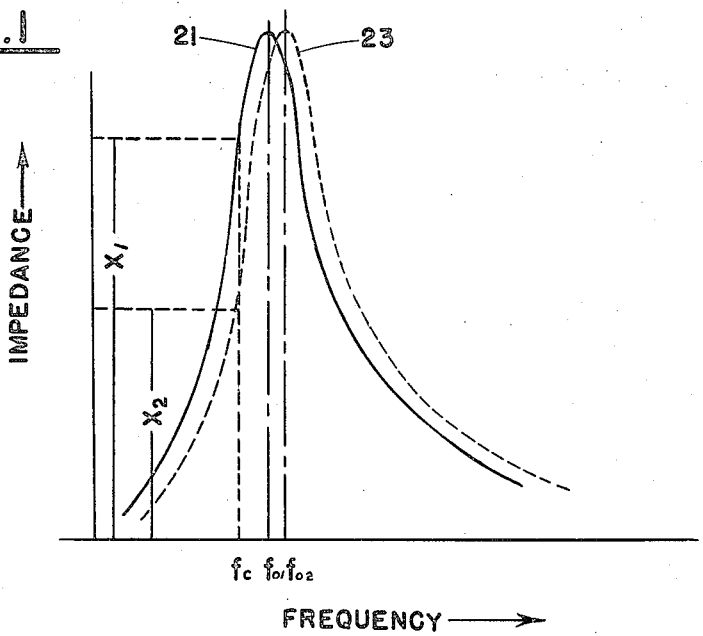
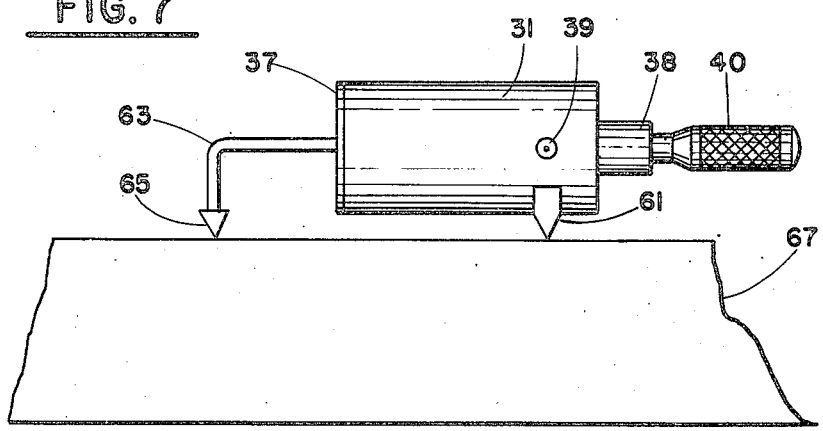
Inventor
GEORGE R. MEZGER
By M. O. Hayes
Attorney Jan. 17, 1950 — G. R. MEZGER — 2,494,570
ELECTRICAL TRANSDUCER Filed Jan. 22, 1946 — 3 Sheets-Sheet 2

Inventor
GEORGE R. MEZGER
By M. C. Hayes
Attorney

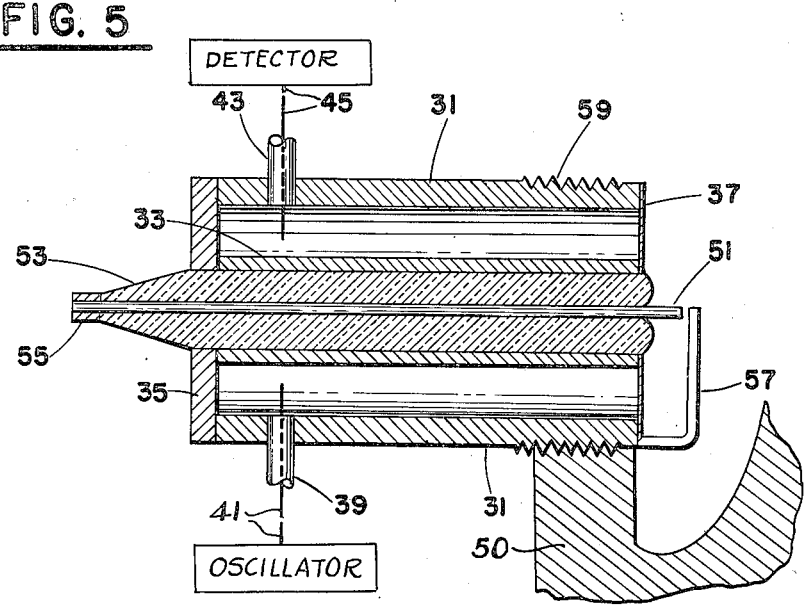
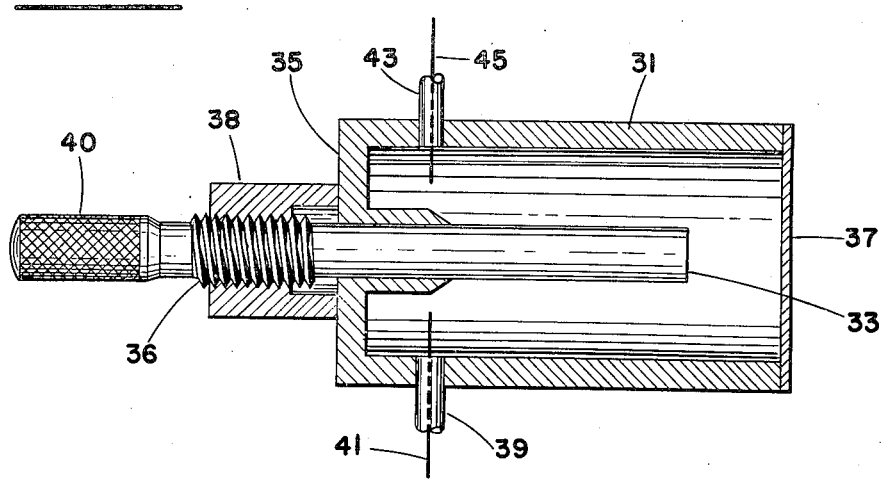
Inventor
GEORGE R. MEZGER

Patented Jan. 17, 1950

2,494,570

UNITED STATES PATENT OFFICE 2,494,570

ELECTRICAL TRANSDUCER

George R. Mezger, United States Navy

Application January 22, 1946, Serial No. 642,781

9 Claims. (Cl. 315—58)

(Granted under the act of March 3, 1883, as amended April 30, 1928; 370 O. G. 757)

This invention relates to pressure-and-dimension-sensitive transducers, and more particularly to an electrical transducer means for modifying high-frequency electrical energy in accordance with changes in applied pressure and micrometric dimensions.

The measurement by electrical means of either absolute or incremental variations of physical quantities, such as pressure and strain, requires a suitable transducer for converting the physical quantity to be measured into an electrical potential, the magnitude of which is a function of said quantity. A typical instance in which such a conversion must be made is in the art of engine-pressure indicators. Here, a pressure-sensitive element must be in contact with or coupled to the pressure chamber, e. g., the cylinder of a heat engine, wherein it is desired to measure either the absolute or varying pressures.

A study of the art discloses a number of types of transducers for converting the fluctuations of such pressure-sensitive elements into voltage variations suitable for presentation on an indicator means. These prior art devices, which include the variable capacitance, the variable resistance, variable inductance, and piezo-electric types, have in common an important disadvantage in that they are responsive to engine vibration, resulting in extraneous indications due to vibration of the pickup device or transducer.

It is therefore the principal object of this invention to provide an electrical transducer for converting variations of pressure and/or linear dimensions into proportional variations of potential, said potential variations being substantially independent of extraneous vibrations.

The installation of a pressure-sensitive transducer in the combustion chamber or manifolds of heat engines, pumps and compressors, where engine and fuel research requires observation of pressures, necessitates permanent and destructive changes in the engine such as providing openings for accommodating the transducer. For this reason, prior art devices do not adapt themselves for field maintenance applications in the case of those engines utilizing electrical ignition.

Accordingly, it is an important object of this invention to provide a pressure-sensitive electrical transducer adaptable for measuring pressures in engines having electrical ignition, the installation of said transducer requiring no destruction or permanent changes in the pressure chamber or cylinder head of such engines.

Inasmuch as pressure-sensitive or dimension-sensitive transducers are frequently required to operate in applications where high temperatures are common, the prior art devices are unsuitable because their physical structure is characteristically unstable when subjected to extreme heat. This is especially true in the case of piezo-electric and carbon-stack types, also in the magnetic types which employ coils and/or permanent magnets.

Therefore, another object of this invention is to provide a transducer whose output calibration is substantially independent of high temperature and/or large changes in ambient temperature.

Certain prior art transducers, notably the magnetic and piezo-electric types, are unreliable in response to low rates of change of pressure or linear dimensions, or they will fail entirely to respond to low rates of change or static conditions. Other types such as the carbon stack are responsive to static conditions, but these have the disadvantage of instability resulting from vibration and heat. The variable-capacitance type is also responsive to low frequencies, but has low sensitivity and causes the circuits to be susceptible to interference from electrical ignition and other sources of disturbance. Since the variable-capacitance type is of necessity small in electrical size and must be placed in shunt with a connecting cable, the capacitance of which may be of the same or larger size than that of the transducer, this transducer is very susceptible to vibration because the capacitance of the connecting cable varies with vibration and thus causes a false signal to be superimposed on that which is developed by the transducer. Further, any high-impedance type of transducer, like the variable-capacitance or piezo-electric, is susceptible to interference or extraneous electrical noises.

Another object of this invention is to provide an electrical transducer having reliable response to low frequency or static conditions of pressure and linear dimensions.

Still another object is to provide an electrical transducer, having applicability as an engine-pressure indicator, which is not sensitive to extraneous electrical noises or interference.

In accordance with the objects of this invention, there is provided a resonant cavity of the type familiar to those skilled in ultra high frequency techniques. As is well known, such cavities are electrically equivalent to an anti-resonant circuit, the resonant frequency of the cavities being a function of their physical dimensions. Hence the response of the cavity to any given frequency will vary with changes of cavity dimensions. The instrument made in accordance with this invention utilizes the cavity response to provide a suitable indication, the cavity being so constructed that its change of linear dimensions is a linear function of the physical quantity to be measured. As will be described later in full detail, the form and the dimensions of the cavity resonator will depend upon the specific applications in which it is employed. In one form the cavity is of such dimensions and design that it can be substituted directly for the spark plug in engines having electrical ignition, thus indications of pressure are possible while the engine is in operation, no changes in the engine being required.

The operation and construction of this invention, together with further objects thereof will be better understood by referring to the following description, taken in connection with the drawings in which:

Figure 1 is a plot showing typical impedance-versus-frequency curves characteristic of anti-resonant electrical circuits;

Figure 5 is a view, taken in cross-section, showing the preferred embodiment of a pressure-sensitive transducer for an engine utilizing electrical ignition;

Figure 6 is a view, taken partly in cross-section, of another embodiment of a transducer made in accordance with this invention;

Figure 7 is a pictorial drawing, taken in elevation, on a reduced scale, illustrating the application of the embodiment shown in Figure 6 to the measurement of strain in constructional materials.

Referring now particularly to Figure 1, curve 21 will be recognized as being a typical impedance-versus-frequency characteristic of a parallel L—C circuit tuned to a frequency $f_{o1}$. When this circuit is excited by a generator delivering a constant current I of frequency $f_c$, across the device will appear a potential of magnitude $IX_1$. If the circuit parameters are varied so that the circuit is tuned to frequency $f_{o2}$, the response is as shown in curve 23, and the potential across the device is $IX_2$.

It is apparent that as the period of the circuit or the frequency of anti-resonance is changed, the potential developed across it will also change. For highly efficient circuits having steep response curves, the potential change is substantially a linear function of small changes of L—C circuit parameters. Thus, given such a circuit whose L—C parameters are a function of its linear dimensions, it is possible to obtain a linear indication of changes in these dimensions. Further, if these changes in linear dimensions can be made to be a linear function of strain in a material or of fluid pressure, there is provided an electrical transducer capable of measuring these physical quantities.

Figure 2:
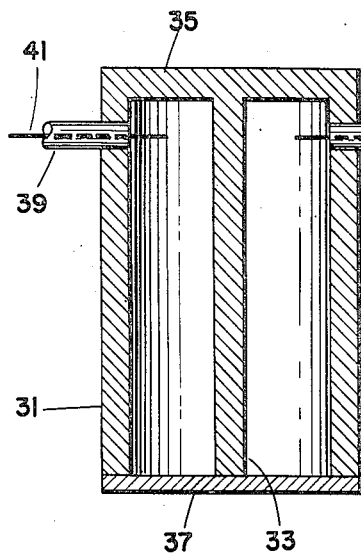
Figure 2 is a simplified view, taken in cross-section, of an elementary type of high-frequency transducer made in accordance with this invention.

For a better understanding of the means provided in accordance with this invention for accomplishing the above-mentioned conversion from changes in physical quantities to electrical potentials, reference is now made to Figure 2.

The assembly is comprised of a hollow metallic cylinder 31, coaxially with which is mounted a metallic electrical conductor 33. The ends of the cylinder are closed by metallic plates 35 and 37, and the center conductor 33 is secured by electrical connection at either end to said plates. Openings are provided in the cylindrical wall to receive the outer conductors of coaxial transmission lines 39 and 43, the inner conductors of which, 41 and 45, respectively, extend into the cavity enclosed by the cylinder and end plates. It will be understood that in this and all of the other forms to be described, except that of Fig. 8, the conductors 41 and 45 are connected to an oscillator and to a detector, respectively, as shown only in Fig. 5 for a general example.

If the above-described cavity is excited by connecting one of said transmission lines, say 39, to a source of high-frequency electrical oscillations, such as marked "Oscillator" in Fig. 5, and the length of conductor 33 is equal to one-half the wave-length of said oscillations, the device of Figure 2 will be electrically equivalent to an L—C tuned circuit having response characteristics as shown in Figure 1.

One closed end plate 37 of the cavity is constructed of thin material so as to provide a pressure-sensitive diaphragm. When the diaphragm is displaced from its normal position of equilibrium, the length of the cavity is changed in proportion, resulting in a proportional change in its frequency response in the manner discussed in connection with Figure 1.

Electrical energy modified by the transducer is removed from the cavity by means of the other coaxial line, 43, from whence it is conducted to a suitable detector such as seen in Fig. 5 which may be of either the vacuum-tube or silicon-crystal type. The detector output constitutes a potential which is proportional to physical displacements of the diaphragm. An indication of the detector output can be had by operating upon it in any desired manner and using it ultimately to provide the potential for one deflection axis of a cathode-ray tube.

While in the foregoing the electrostatic type of cavity coupling probes 41 and 45 were described for simplicity, the transducer of this invention is in no way limited to this type of coupling. A magnetic coupling loop, for example, can be used as an alternative in the manner well known to the ultra high frequency art.

It also is possible to use a single electric or magnetic coupling element for performing the input and output coupling functions of the two coupling means described in the foregoing. In this case, the coaxial transmission line can be provided with a branch, or T connection, one branch of which is connected to the resonant cavity, the remaining two branches being connected to a source of ultra-high frequency oscillations and to detector-indicator circuits. By this means, increased efficiency of the resonant cavity can be obtained through the reduction of losses in the cavity achieved by the introduction of only one coupling element.

Figure 3:
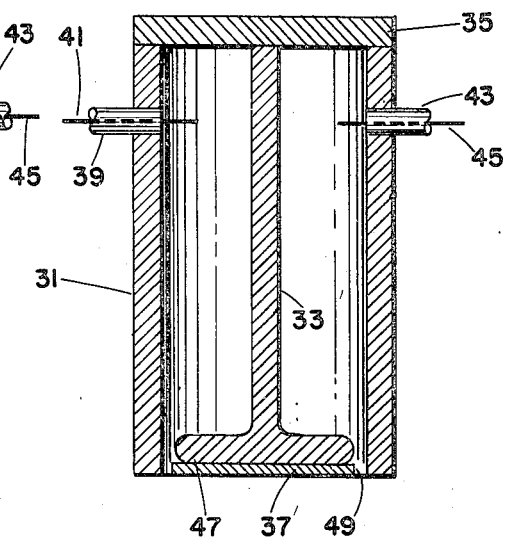
Figure 3 is a modification of Figure 2.

Referring now to Figure 3, which is a modification of the transducer means of Figure 2, identical reference numerals refer to identical parts common to both devices. In Figure 3, the transducer is modified by terminating the coaxial conductor 33 with a capacitor, rather than by securing it mechanically to the thin diaphragm 37, said capacitor means comprising a flat metal disc, 47, secured to the coaxial rod, and there being a space between parallel disc and diaphragm in which is inserted a dielectric substance 49 such as mica. This modification is equivalent to a quarter-wave transmission line shorted at one end and having capacitive loading at the other end.

The transducer described immediately above is employed and energized in the same way as is that of Figure 2. A pressure exerted upon the sensitive diaphragm will change the capacitance at the end of the line and therefore will change the response characteristics of the cavity and produce an output signal as previously described. The dielectric 49 may simply be air, in which case the diaphragm will have less loading and more freedom of movement. Therefore, the device of Figure 3 is capable of higher sensitivity than that of Figure 2.

Figure 4:
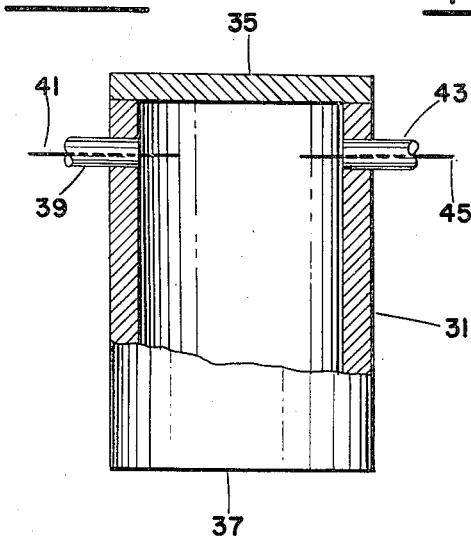
Figure 4 is a simplified drawing, taken partly in cross-section, showing a high-frequency resonant cavity modified in accordance with this invention.

In Figure 4 is shown another type of resonant cavity which can be adapted to the present invention. This cavity, known to the art as a pure resonant cavity, is identical to that shown in Figure 2 with the exception that the coaxial rod 33 is not used. The removal of this rod results in a great change in the mode of operation of the cavity. If it were desired to construct a cavity of the type shown in either Figure 2 or 3 which would be of a very small size for operation at frequencies of the order of 30,000 mc./sec., the design would be difficult and unwieldy as the inner coaxial rod would theoretically be about one-half centimeter or less in length. However, the pure resonant cavity type is simply a closed, hollow cylinder and lends itself admirably well to calculation of dimensions and construction for ultra-high frequency operation. For example, a cylindrical cavity 1 cm. long and 1 cm. in diameter will operate at frequencies about 24,000 mc./sec. Such frequencies can be generated by oscillators of the velocity-modulated type, and thus there is provided an extremely small, compact transducer.

Reference is now made to Figure 5 which shows the preferred embodiment of my invention for indicating pressures in engines which use electrical ignition.

This transducer is the same in electrical principle as that shown in Figure 2, but it is greatly altered physically, as will be described in the following, so as to provide simultaneous electrical ignition and pressure indication without the necessity of cutting an additional orifice in the cylinder head 50 of the engine. The cavity is of the coaxial type, as before, and is comprised of outer cylindrical wall 31; inner conductor 33, which is made of hollow metal tubing and mounted coaxially with the outer wall 31; a circular flat ring 35 which closes one end of the cavity; and a circular flat ring 37, which is made of thin flexible metal so as to serve both as a pressure-sensitive diaphragm and as a cover for the remaining end of the cavity. An ignition lead 51 is passed through the hollow inner conductor 33, being electrically insulated therefrom by suitable insulator 53 which may be made of porcelain. The insulator is extended through the top of the transducer as shown and is capped with a standard ignition terminal 55.

A conducting rod 57 is secured at one end to the lower edge of member 31, and the other end is brought in close proximity to the bottom end of ignition lead 51 so as to form a small spark gap of the type used in the spark plugs of the engine. Therefore, by making member 31 equal in diameter to the engine's spark plugs and by forming threads 59 therein of the same pitch as those of the spark plugs, the transducer so constructed can be substituted directly for any one of the engine's spark plugs. Thus the engine will operate normally and the cylinder gas pressures against the diaphragm 37 will cause it to deflect. By coupling the cavity to a high-frequency oscillator and detector by means of coaxial lines 39 and 43, exactly as described previously, the deflections of the diaphragm will modify said electrical energy so as to provide indications on a cathode-ray tube or other indicator means.

The transducer so constructed permits operation which is free from electrical interference due to ignition while simultaneously providing ignition potentials. The response of this transducer is uniform at the low-frequency end of its scale to zero frequency. Therefore it can be used for low-speed indications as well as for high speed indications, and it can even be used to indicate static pressures. With the high output-level of the device, amplification of zero- and low-frequency signals presents no serious problems.

Still another modification of this invention is shown in Figure 6, which utilizes a hybrid form of cavity, a transition between that shown in Figure 2 and that of Figure 4. Here, the coaxial conductor 33 is provided with threads 36 which engage threads formed in end bell 38, the latter being either an integral part of end plate 35 or secured thereto. Knurled knob 40 terminates the coaxial rod, thus the latter can be moved in and out of the cavity through a suitable orifice provided in the end plate as shown. In this way, the transducer can be operated with an oscillator of constant frequency and can be "tuned," over a reasonable range, to the frequency of the oscillator. In operation, of course, the cavity would be tuned very near to, but not exactly on the oscillator frequency. The method of tuning and coupling the cavity to the oscillator are well known to the ultra high frequency art, and they will not be described further herein, otherwise the principles of operation of this embodiment are the same as described previously.

The embodiment of Figure 6 is particularly adaptable to the measurement of strains in metal beams and other constructional materials. In Figure 7 there is shown pictorially an arrangement for accomplishing this. Secured to the cavity wall 31, externally, is a knife edge 61. Further, a connecting rod 63 is formed as shown and secured to diaphragm 37, and also secured to another knife edge 65. Both knife edges are clamped by means not shown to a beam 67, in which it is desired to measure strain in the section between the knife edges. Transmission line 39 is coupled as described before to a suitable oscillator (not shown), and the cavity is tuned near to the oscillator frequency by turning knob 40.

In operation, it is apparent that if the portion of the beam between knife edges is strained by lengthening, diaphragm 37 will be flexed outwardly, resulting in lengthening the cavity and altering its output potential. If the beam is compressed, the diaphragm will be moved inwardly, and the output of the cavity changed accordingly.

All of the transducers described in the foregoing operate on a common principle, i. e., they are equivalent to a variable impedance having input and output terminations. With a signal of constant frequency input, the signal is modified in such a way that it is amplitude modulated at the output termination. The transducer provided in accordance with this invention can be adapted to frequency-modulation techniques so that the frequency of an oscillator can be varied by the transducer as a function of pressure. Pressure intelligence which is carried in the frequency-modulated carrier wave can be removed for providing a suitable indication by means of a frequency-discriminator circuit. It should be understood that the pressure or force application means for the diaphragm of Figs. 5 and 7 may be used in association with the diaphragms of the various other forms.

Figure 8:
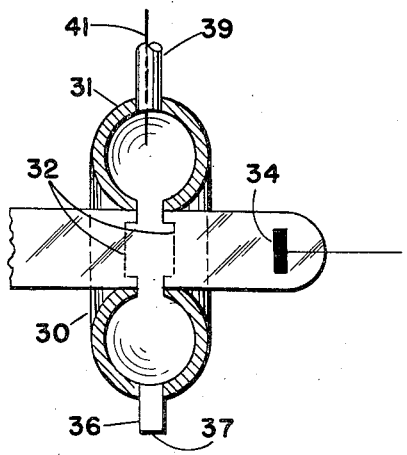
Figure 8 is a simplified drawing, taken in cross-section, of another embodiment of the transducer made in accordance with this invention.

Such a device is shown in Figure 8 where reference numeral 30 generally indicates a reflex oscillator of the velocity-modulation type which is used for generating frequencies of the order of 2000 mc./sec. and higher. The oscillator 30, shown partly broken away, includes resonant cavity 31, grids 32 connected to said cavity, and collecting anode 34. Inasmuch as the oscillator per se is well known and forms no part of this invention, the discussion will be limited herein to the cavity and the transducer means associated therewith.

The cavity 31 may be either of the toroidal or reentrant shape, and in common with the other embodiments described preceding, it is fitted with a transmission line 39, and output coupling loop 41. The cavity is also provided with an orifice in which is inserted a hollow pipe 36, one end of which opens into the cavity as shown, and the other end of which is closed with a flexible diaphragm 37.

The frequency of such an oscillator can be varied by varying the dimensions of the cavity, as is well known to those skilled in the art. When pressures, which are to be measured, are brought to bear upon the flexible diaphragm, the mean effective diameter of the cavity is varied, and therefore, the generated frequency is modulated accordingly. All that remains to be done to complete the transducer-indicator is to connect the cavity output line 39, 41 to a suitable frequency-discriminator which converts the varying frequencies to varying potentials for presentation on an indicator such as a cathode-ray tube. It is to be understood that the cavity-transducer means is not limited in frequency-modulation applications to the velocity-modulation oscillator described above. In general, the cavity can be employed as a frequency-determining circuit element in any ultra high frequency oscillator.

It is apparent that the transducer device described in full detail hereinbefore is not subject to many of the limitations imposed upon prior art devices. Because of the ruggedness and simplicity of construction of circuit elements at ultra high frequencies, all of which resolve into either hollow cavities or coaxial lines of discreet dimensions, the problems of temperature and vibration can be minimized to a negligible amount. This invention employs no elements such as piezoelectric crystals, carbon stacks, or coils and magnets which are subject to destruction and erroneous indications due to heat, vibration, pressure, and electrical interference.

Although many modifications and applications of this invention can be conceived by those skilled in the art to which it appertains, it is not limited to the embodiments described in this specification.

The invention described herein may be manufactured and used by or for the Government of the United States of America for governmental purposes without the payment of any royalties thereon or therefor.

I claim:

1. An electric transducer, comprising in combination, a hollow metallic cylinder having input and output electric coupling means; a metallic plate for closing one end of said cylinder; a flexible metallic diaphragm for closing the other end of said cylinder; and a metallic conductor disposed concentrically with said cylinder, one end of said conductor being secured to said metallic plate, and the other end of said conductor being secured to said diaphragm, said diaphragm being displaceable by applied pressures so as to vary the mean effective length of said cylinder.

2. An electric transducer, comprising in combination, a hollow metallic cylinder having input and output coupling means; a metallic plate for closing one end of said cylinder, said plate having an opening formed therethrough and substantially concentric therewith; a flexible metallic diaphragm for closing the other end of said cylinder; a metallic rod fitted into said opening in said metallic plate; micrometer means for moving said rod in and out of the cavity formed within said cylinder, metallic plate, and diaphragm, and means for supplying pressures to be measured upon said diaphragm so as to cause a displacement thereof and a resultant change of spacing between said diaphragm and the end of said rod within said cavity.

3. An electric transducer for measuring pressures within the cylinders of heat engines having electric ignition, comprising in combination, a hollow metallic cylinder having input and output coupling means; a further hollow metallic cylinder having substantially the same length as above said cylinder but having a smaller radius, said cylinders being disposed in concentric relation with one another; a flat metallic disc having a radius substantially equal to the radius of the larger of said cylinders, and further having an opening therethrough, said opening having a radius substantially equal to the radius of the smaller of said cylinders, and said disc being secured to one end of said cylinders; a thin flexible diaphragm having the same dimensions in diameter and opening as said disc, said diaphragm being secured to the other end of said cylinders so as to form a cavity in the space between said cylinders, disc, and diaphragm; an insulating medium filling the space within the smaller of above said cylinders; an electric ignition lead embedded in said insulating medium substantially coaxially with said cylinders, said ignition lead being longer in length than said cylinders so that a portion extends from each end of said insulator; a metallic rod secured at one end near the outer edge of said diaphragm, the other end of said rod being brought in near proximity to one free end of said ignition lead so that a spark gap is formed therebetween.

4. The invention according to claim 3, said larger cylinder having screw threads formed thereon near the end in closest proximity to said diaphragm, said threads having a pitch and diameter substantially equal to that of the spark plugs used in the engine in which pressures are to be measured in order that said transducer can be substituted directly for any one of said spark plugs; an ignition terminal secured to the free end of said ignition lead opposite said spark gap so that electric ignition potentials can be supplied between said terminal and said larger cylinder, engine cylinder pressures being brought to bear upon said diaphragm so as to cause a deflection thereof and a resulting variation of the length of said cavity.

5. The invention according to claim 3, said input-coupling means comprising a coaxial transmission line having inner and outer conductors adapted and intended to be connected to a source of substantially constant-frequency electric oscillations at one end thereof, and said outer conductor at the other end thereof being fitted and secured into an opening formed through the wall of said larger cylinder, and said inner conductor at the other end thereof extending into said cavity so as to induce energy of said oscillations therein; said output coupling means comprising a coaxial transmission line having outer and inner conductors, and said outer conductor at the other end thereof being fitted and secured into an opening formed through the wall of said larger cylinder, and said inner conductor at the other end thereof extending into said cavity so as to have said energy amplitude modulated by said transducer, induced therein.

6. The invention according to claim 3, said larger cylinder having screw threads formed thereon near the end in closest proximity to said diaphragm, said threads having a pitch and diameter substantially equal to that of the spark plugs used in the engine in which pressures are to be measured in order that said transducer can be substituted directly for any one of said spark plugs; an ignition terminal secured to the free end of said ignition lead opposite said spark gap so that electric ignition potentials can be supplied between said terminal and said larger cylinder, engine cylinder pressures being brought to bear upon said diaphragm so as to cause a deflection thereof and a resulting variation of the length of said cavity, and said input-coupling means comprising a coaxial transmission line having inner and outer conductors adapted and intended to be connected to a source of substantially constant frequency electric oscillations at one end thereof, and said outer conductor at the other end thereof being fitted and secured into an opening formed through the wall of said larger cylinder, and said inner conductor at the other end thereof extending into said cavity so as to induce energy of said oscillations therein; said output coupling means comprising a coaxial transmission line having outer and inner conductors, and said outer conductor at the other end thereof being fitted and secured into an opening formed through the wall of said larger cylinder, and said inner conductor at the other end thereof extending into said cavity so as to have said energy amplitude modulated by said transducer, induced therein.

7. An electrical transducer designed in the form of a spark plug and comprising, a metal sleeve having one end externally threaded for reception by an engine cylinder, and having its other end closed by an axially apertured wall, an apertured flexible diaphragm attached to the threaded end of the sleeve, a core of di-electric material extending snugly through said apertures and having a sparking electrode embedded therein from end to end, a second electrode secured to the threaded end of the sleeve and extending into proximity to said sparking electrode, and means for coupling an oscillator and a detector separately to said sleeve to cause it to operate as an electrically resonant cavity.

8. In an electric transducer of the type described, an elongated electrically resonant cavity having a characteristic frequency of resonance determined by the length thereof, flexible diaphragm means closing one end of said cavity and varying said frequency of resonance in proportion to the cavity length, means deflecting said diaphragm as a function of the external pressure applied thereto for varying said resonant frequency, means including an oscillator and a tuned linear input antenna probe disposed within the cavity at right angles to the length thereof and in a region of maximum electrical resonant force for forcing electrical oscillations within the cavity, and a linear output antenna probe disposed in the cavity parallel to a plane including the input probe and within a region of maximum electrical force of the resultant cavity oscillations for transmitting a portion of the energy of said resultant oscillations to a frequency indicating means.

9. An electric transducer of the type described comprising, an electric cavity having a normal frequency of cavity resonance determined by the length thereof, flexible diaphragm means closing one end of said cavity, said diaphragm being deflectible to vary the length of the cavity and the resonant frequency thereof from said normal as a direct function of external pressure applied thereto, means including an oscillator and a first linear probe disposed within the cavity normal to the length thereof for forcing electrical oscillations within the cavity, and a second linear probe disposed within the cavity normal to the length thereof for transmitting a portion of the energy of said varied frequency of oscillations to a frequency indicating means.

GEORGE R. MEZGER.

REFERENCES CITED

The following references are of record in the file of this patent:

UNITED STATES PATENTS

| Number | Name | Date |
|---|---|---|
| 2,174,701 | Koch | Oct. 3, 1939 |
| 2,178,471 | De Bruin | Oct. 31, 1939 |
| 2,190,713 | Hintze | Feb. 20, 1940 |
| 2,238,117 | Koch | Apr. 15, 1941 |
| 2,242,404 | Schussler | May 20, 1941 |
| 2,306,282 | Samuel | Dec. 22, 1942 |
| 2,312,919 | Litton | Mar. 2, 1943 |
| 2,355,088 | Lavoie | Aug. 8, 1944 |
| 2,367,866 | Humphreys et al. | Jan. 23, 1945 |
| 2,394,397 | Mouromtseff et al. | Feb. 5, 1946 |
| 2,402,948 | Carlson | July 2, 1946 |
| 2,408,425 | Jenks | Oct. 1, 1946 |
| 2,409,321 | Stephan | Oct. 15, 1946 |
| 2,412,659 | Thomas | Dec. 17, 1946 |
| 2,415,962 | Okress | Feb. 18, 1947 |
| 2,428,272 | Evans | Sept. 30, 1947 |